Sept. 25, 1951 W. K. CARTER 2,569,227
APPARATUS FOR TRANSFERRING POWDERED MATERIAL
Filed Dec. 6, 1947 6 Sheets-Sheet 1

INVENTOR.
WILLARD K. CARTER
BY
Herschel C. Omohundro
Attorney

INVENTOR.
WILLARD K. CARTER
BY
Herschel E. Omohundro
attorney

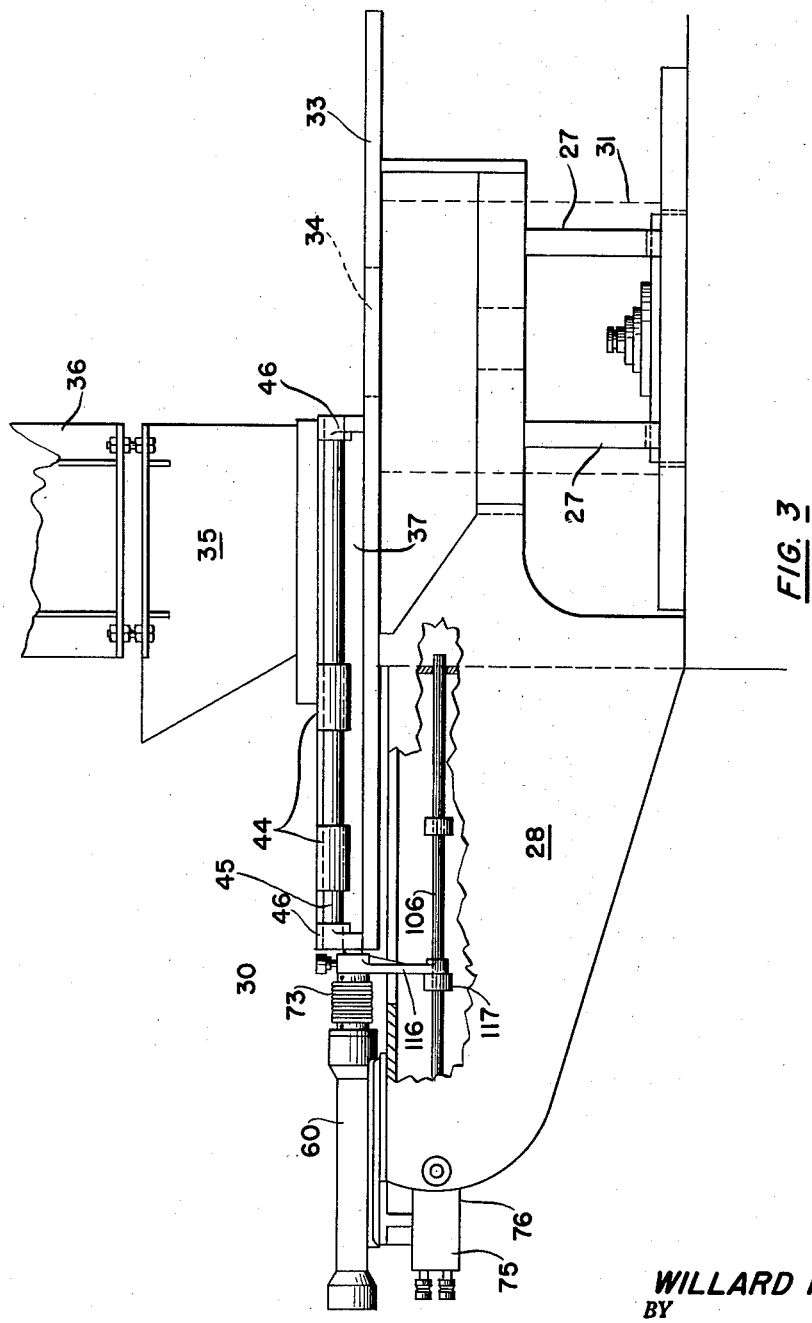

Sept. 25, 1951 W. K. CARTER 2,569,227
APPARATUS FOR TRANSFERRING POWDERED MATERIAL
Filed Dec. 6, 1947 6 Sheets-Sheet 4
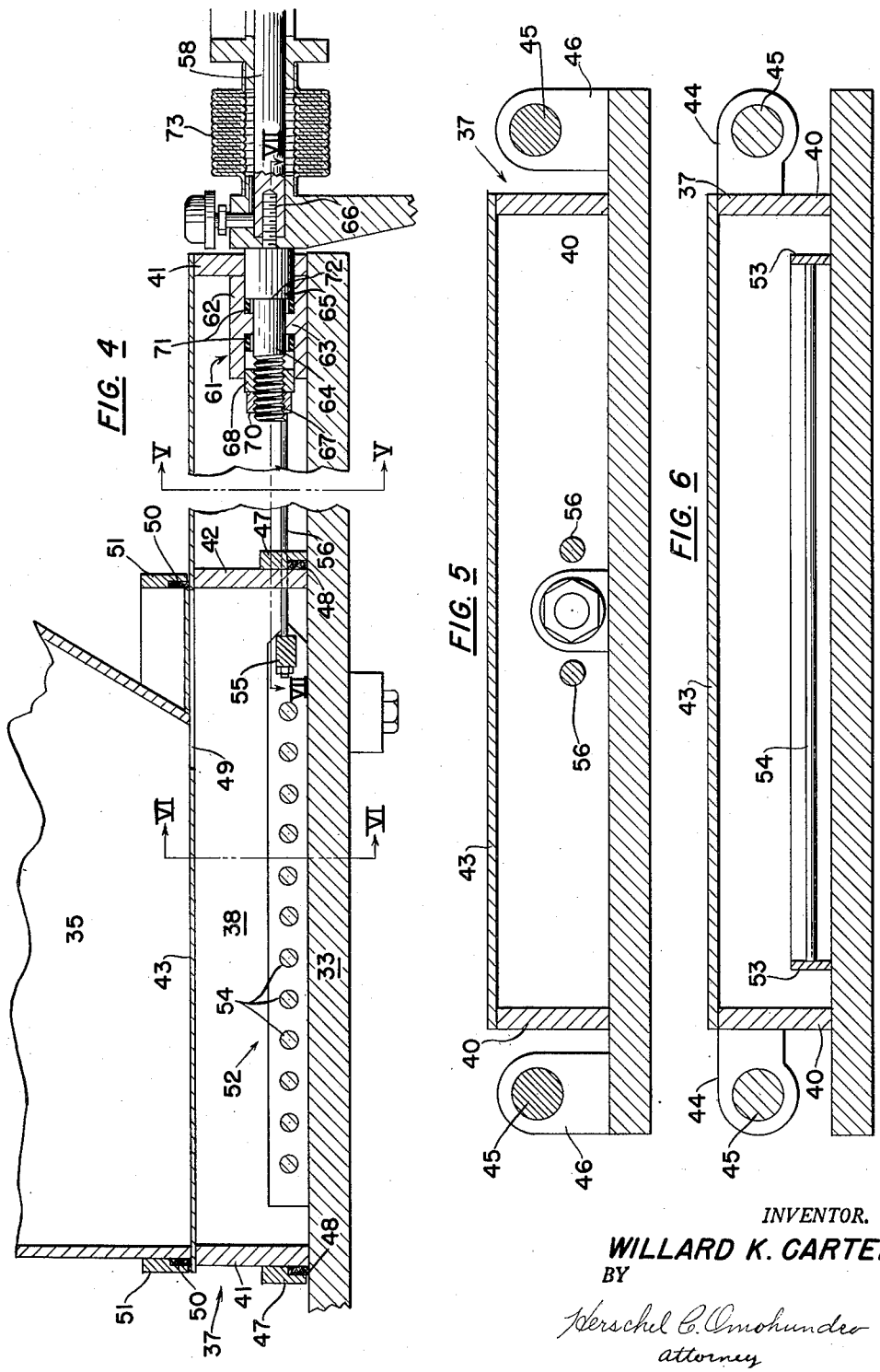
INVENTOR.
WILLARD K. CARTER
BY
*Herschel C. Omohundro*
attorney Sept. 25, 1951 W. K. CARTER 2,569,227
APPARATUS FOR TRANSFERRING POWDERED MATERIAL
Filed Dec. 6, 1947 6 Sheets-Sheet 5
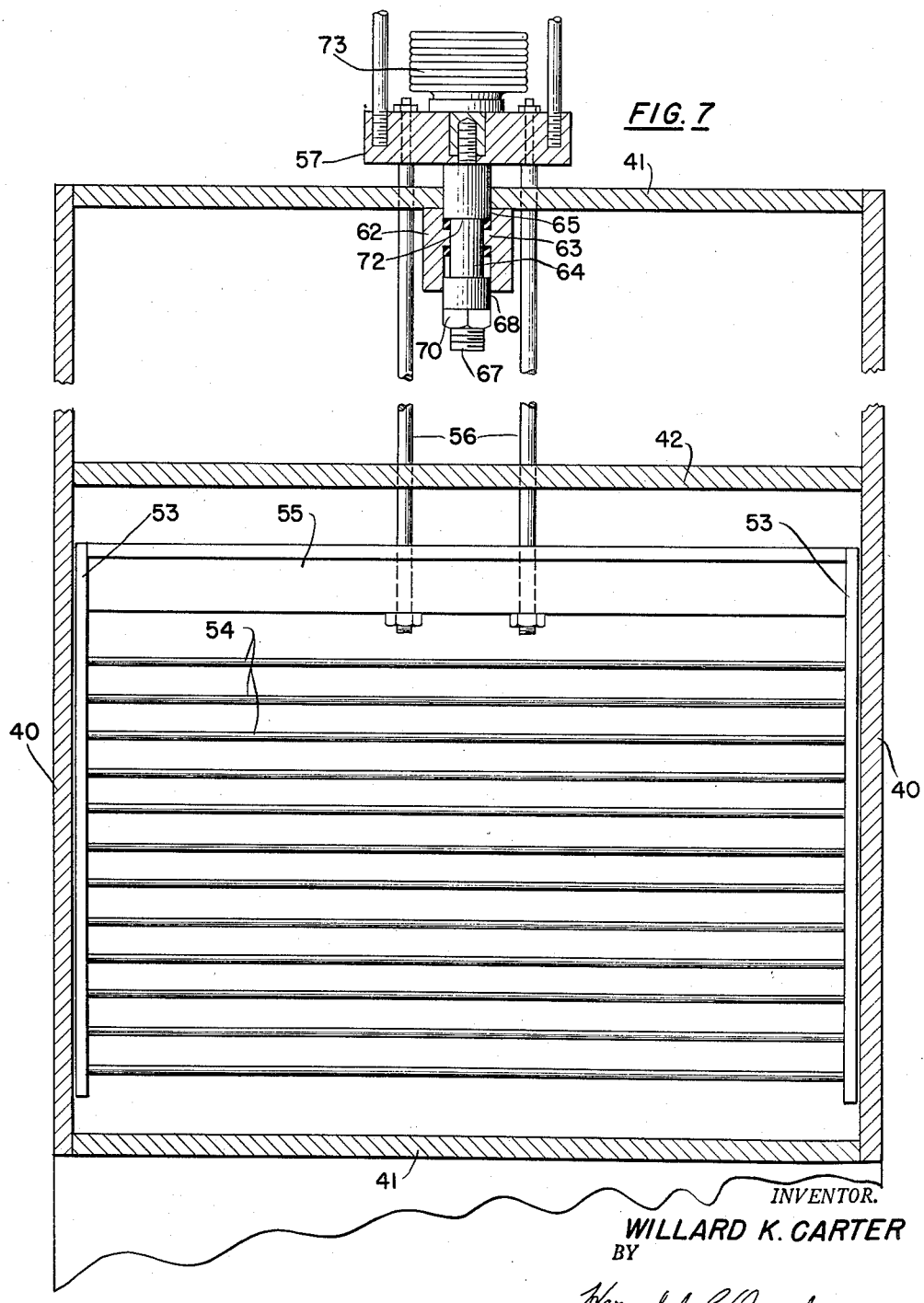

Patented Sept. 25, 1951

2,569,227

UNITED STATES PATENT OFFICE 2,569,227

APPARATUS FOR TRANSFERRING POWDERED MATERIAL

Willard K. Carter, Columbus, Ohio, assignor to The Denison Engineering Company, Columbus, Ohio, a corporation of Ohio Application December 6, 1947, Serial No. 790,165

5 Claims. (Cl. 18—30)

This invention relates generally to apparatus for pressing powdered materials and more specifically to apparatus for transferring powdered materials from one point to another.

Another object of the invention is to provide apparatus for transferring pulverized material from a hopper to a mold in a press in which the powdered material is subjected to forces to form articles therefrom.

Another object of the invention is to provide apparatus for transferring pulverulent material from one point to, and discharging it at, another point, the apparatus having a box-like member forming a compartment, and an agitator disposed therein, the agitator being movable to cause a more effective discharge of the material from the compartment at the delivery point.

Another object is to provide apparatus for transferring powdered material from one point to, and discharging it at, another point, the apparatus including a plate-like support, a box-like compartment-forming member mounted for sliding movement on the support and a motor for reciprocating the compartment forming member on the support between loading and discharging points.

A further object of the invention is to provide apparatus for transferring pulverized material from a hopper to a mold, the apparatus including a plate-like support, a box-like compartment forming member mounted for sliding movement on the support from a position in registration with the hopper to a point of material discharge into the mold, the apparatus also having an agitator in the compartment in said box-like member and a motor for moving the member and the agitator, there being connections between the motor and the member and agitator which will permit the member and agitator to be moved to the point of material discharge in unison then permit the agitator to be reciprocated through a limited distance while the box-like member is stationary over the mold.

A further object of the invention is to provide apparatus for transferring pulverized material including a box-like compartment-forming member mounted for sliding movement between a point in registration with a hopper and a point of material discharge, the box-like member having a cover with an opening which is smaller in size than the area of the compartment, this opening moving across the lower end of the hopper during the movement of the box-like member to a loading point, the compartment in the box-like member having an agitator comprising a plurality of spaced longitudinally extending side members and spaced transversely extending bars or rods connecting the side members, the apparatus also including a power cylinder, the piston of which is connected with the box-like member by a lost motion connection and with the agitator by a direct connection. This method of connecting the piston providing for movement of the agitator alone on initial movement of the piston, continued movement of the piston causing movement of the box-like member and agitator in unison, the apparatus being further provided with a control valve for governing the operation of the power cylinder, which valve causes limited reciprocation of the piston at one end of the normal stroke thereof, the length of these limited reciprocations being such as to permit movement of the agitator while the box-like compartment-forming member remains idle.

Further objects and advantages of the present invention will be apparent from the following description, reference being had to the accompanying drawings wherein a preferred form of embodiment of the invention is clearly shown.

In the drawings:

Figure 3 is a side elevational view partly in vertical section on an enlarged scale showing the material feeding apparatus.

Figure 4 is a detail vertical longitudinal sectional view taken through part of the feeding apparatus on a still larger scale.

Figure 5 is a vertical transverse sectional view taken through the apparatus on the plane indicated by the line V—V of Figure 4.

Figure 6 is a similar view taken on the plane VI—VI of Figure 4.

Figure 7 is a detail horizontal sectional view taken through the compartment-forming member of the feeding apparatus on the plane indicated by the line VII—VII of Figure 4.

Figure 1:
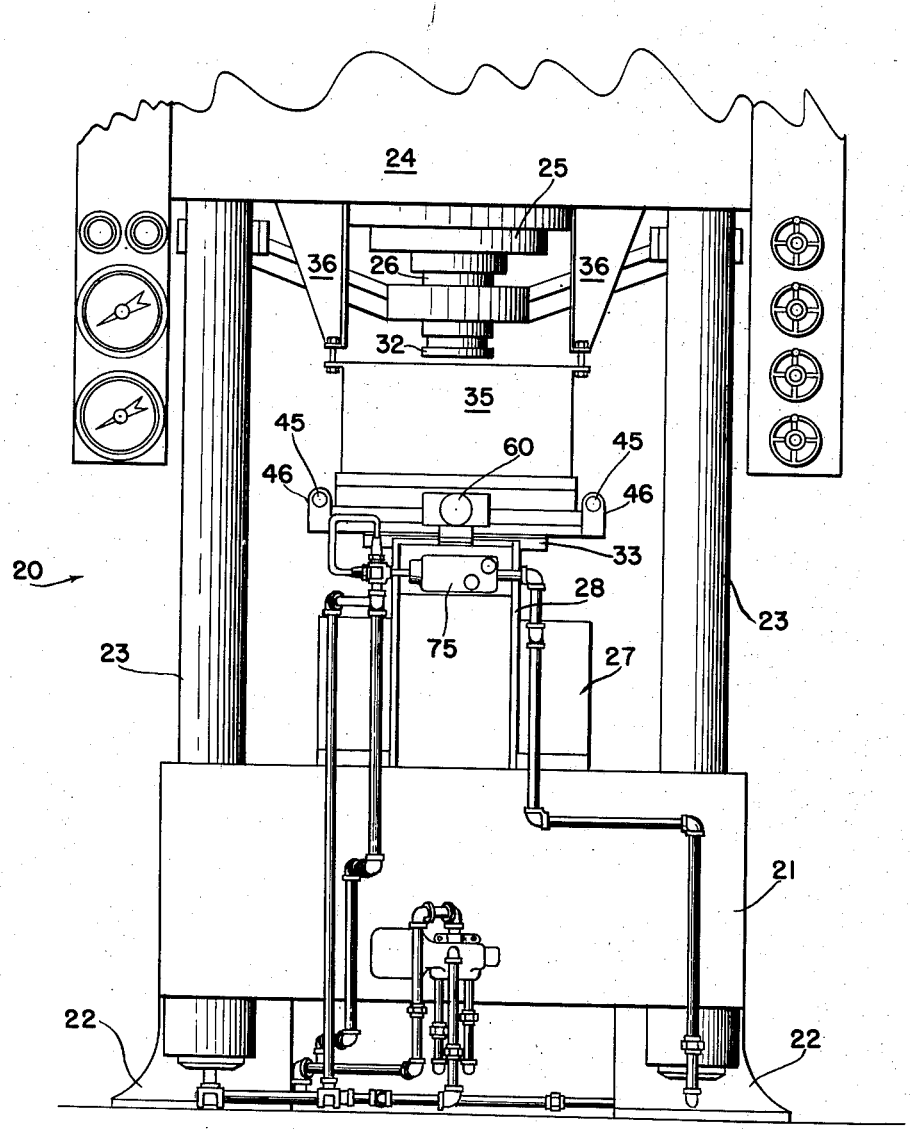
Figure 1 is a front elevational view of a press provided with the material feeding apparatus forming the subject matter of the present invention.
Figure 2:
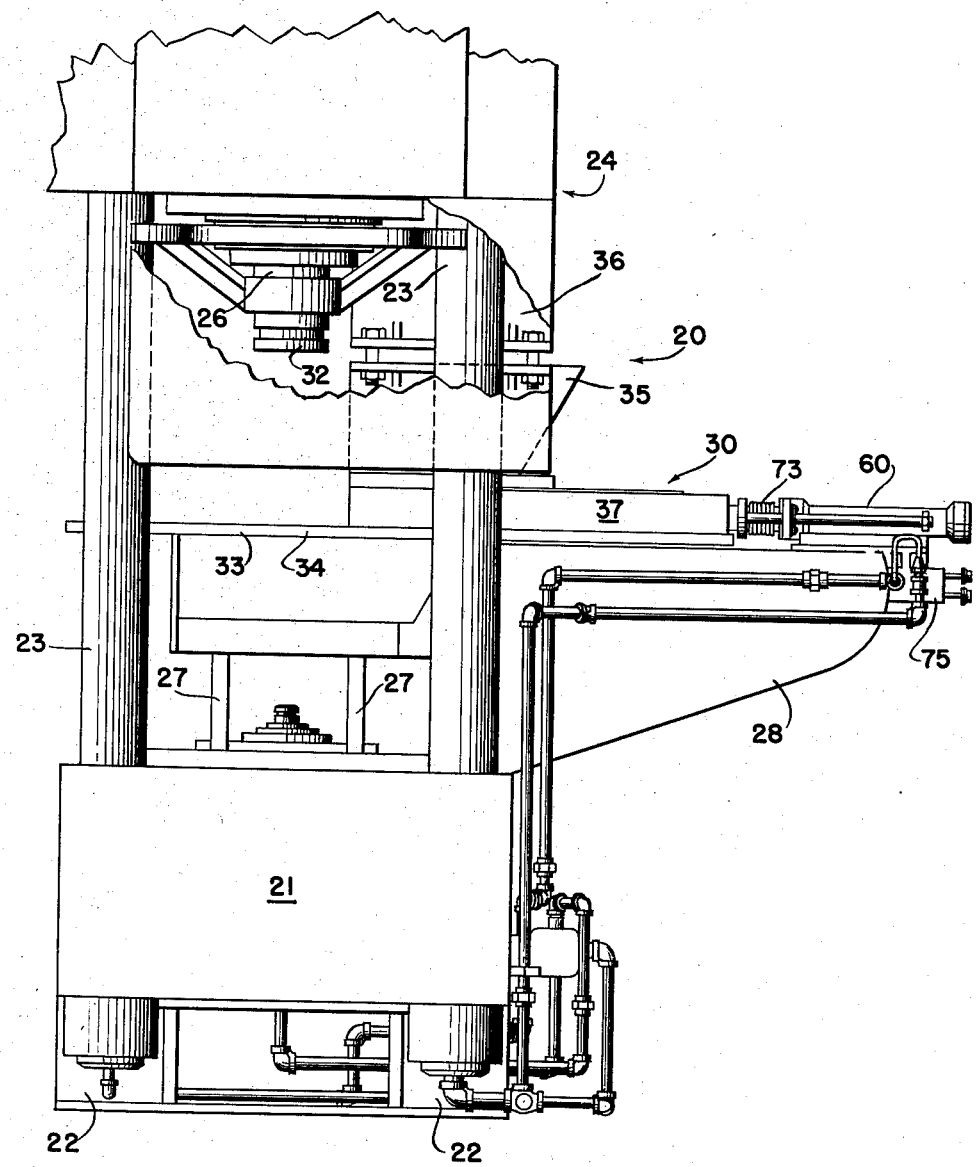
Figure 2 is a side elevational view of the press shown in Figure 1.

Referring more particularly to the drawings, the numeral 20 designates generally the press to which the feeding apparatus is applied. This press includes a base section 21 which is supported on feet 22 and has upwardly directed strain rods 23 projecting therefrom, these strain rods supporting a head section 24 in which a power cylinder 25 is in turn supported. This power cylinder 25 has a ram 26 depending therefrom, the ram being supported for vertical movement as is customary in presses of this character. The base 21 also supports bracket members 27 and a frame 28 for the feeding or transferring apparatus which is designated generally by the numeral 30. The brackets 27 are arranged exteriorly of a mold 31 in which a cavity, not shown, is provided to receive powdered material and a punch 32 carried by the lower end of the ram 26, the punch compressing the powdered material to form the desired article. Brackets 27 and 28 carry at their upper portions a flat, plate-like support 33, this member being disposed above the mold and having an opening 34 therein in registration with the mold, this opening being also in registration with the ram 26 and punch 32 supported thereon.

Support 33 extends toward the front of the press and under a hopper 35, which is suspended by angle plates 36 from the head 24. The plate 33 supports for sliding movement, a box-like conveyor member 37 in which a compartment 38 is formed. The member 37 includes side and end strips 40 and 41 which are connected to form a rectangular frame and an intermediate partition strip 42 extends between the side members 40 to provide the material-receiving compartment 38. The upper end of this compartment is closed by a plate 43 in which a hole 49 is formed, this hole being located near the rear end of the compartment.

As shown in Figure 6 the side members 40 have ears 44 projecting therefrom, these ears being provided with openings for the reception of guide rods 45, the end portions of which are mounted in brackets 46 projecting upwardly from the support 33. The ears 44 and side plates 40 are of such dimensions that the lower edges of the side plates rest lightly on the support 33 and may be slid over the support with little effort. The front wall 41 and partition 42 have strips 47 secured thereto, these strips confining felt wiper members 48 to the rear and front walls to maintain the surface of the support 33 free from the powdered material during movement of the conveyor member 37. The top plate 43 of the conveyor extends to the end wall 41 and serves to close the lower end of the hopper 35 when the conveyor is moved forwardly to a position over the mold. This top plate is also wiped free of powdered material when the conveyor moves, by felt strips 50, held in place at the lower end of the hopper by strips 51.

To insure an effective discharge of the powdered material from the conveyor into the mold the former is provided with an agitator designated generally by the numeral 52, this agitator includes longitudinally extending side bars or strips 53 and transversely extending rods 54. The bars 53 are, in this instance, formed of strip stock and have longitudinally spaced openings for the reception of the round ends of the bars 54. The bars 53 are shorter in length than the compartment 38 so that the agitator may be moved longitudinally in the compartment for a limited distance and at their rear ends, the bars 53 are connected by a transversely extending bar 55 to which a pair of rods 56 are connected. These rods extend through the partition 42 and through the end wall 41 and are connected at their outer ends to a block 57, this block being secured to the outer end of the piston rod 58 forming a part of a fluid power cylinder 60 employed to reciprocate the conveyor box between positions in registration with the hopper and the mold. The forward end of piston rod 58 is also connected to the end wall 41 of the conveyor box by a connection 61 shown more particularly in Figure 4. This connection includes a sleeve 62 which is suitably secured to the end wall 41 and has an internal flange 63 formed therein. This sleeve receives the shank 64 of a bolt-like member 65 which is provided with a reduced threaded extension 66 received by the forward end of the piston rod 58. The opposite end of the member 65 is threaded as at 67 to receive a threaded collar 68 and lock nut 70. It will be noted that the collar 68 is so positioned on member 65 that this member will be capable of limited longitudinal movement in sleeve 62 before transmitting longitudinal motion in either direction thereto. A pair of resilient gaskets 71 are disposed adjacent the internal flange 63 to absorb shock caused by the engagement of the collar 68 or shoulder 72 on the member 65 therewith. This connection provides for lost motion between the piston rod and the conveyor box which will take place at either end of travel of the conveyor.

To protect the piston rod and power cylinder from foreign matter, an accordion type sheath 73 is provided around the piston rod 58. This sheath is connected at one end to the power cylinder and at the other end to the bar 57; in Figure 4 this sheath is shown in its collapsed condition. The power cylinder 60 slidably receives a piston 74 to which the piston rod 58 is connected. This power cylinder is controlled in operation by an automatic valve 75 which is secured to the under side of the power cylinder and supported by the bracket 28. This valve is of the type shown in the copending application Serial No. 761,973, filed July 18, 1947, now Patent No. 2,546,581 in the name of Cecil E. Adams. It is shown diagrammatically in Figure 8 of the present drawings.

Figure 8:
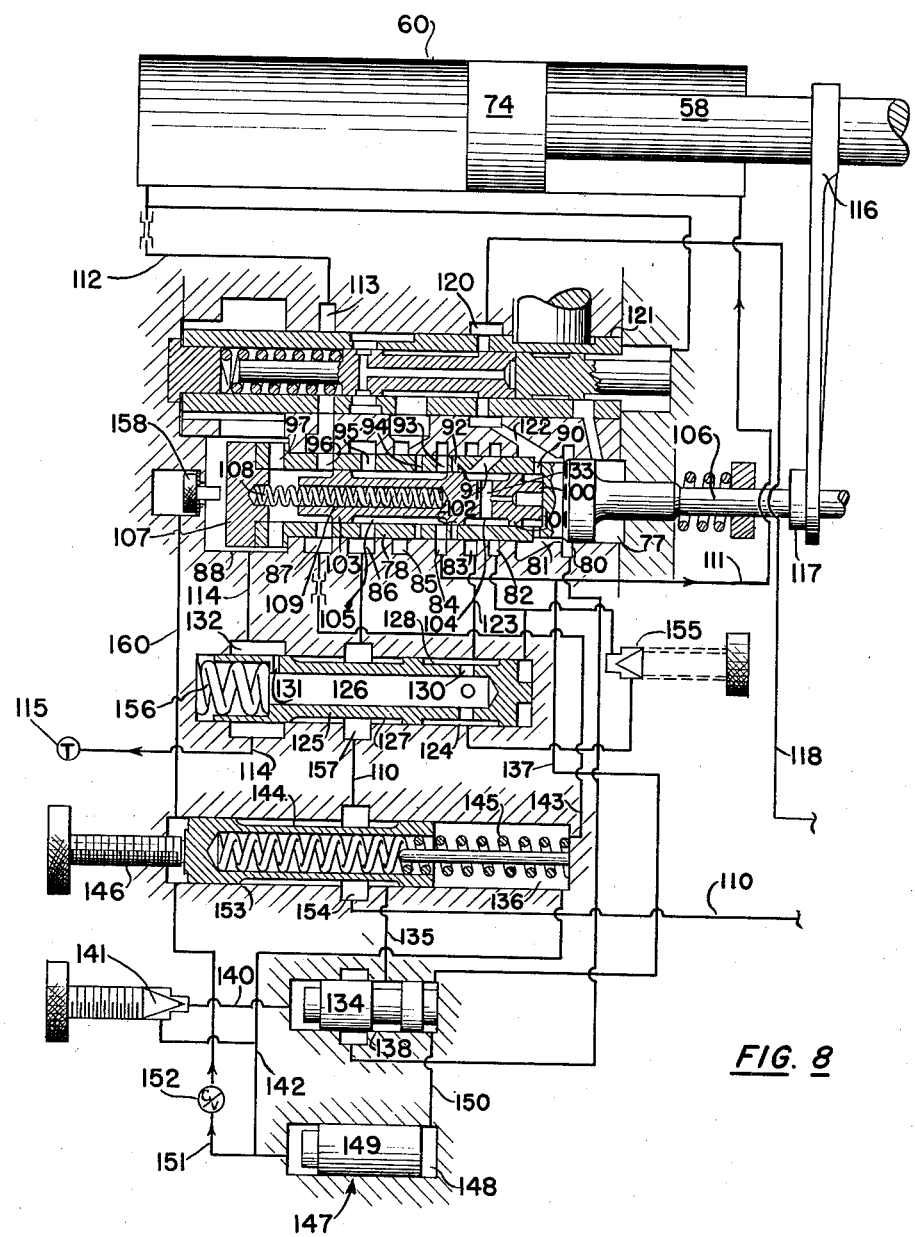
Figure 8 is a diagrammatic view of the hydraulic circuit used in the operation of the feeding apparatus, this circuit showing the power cylinder and valve mechanism for controlling the operation thereof.

This valve includes a body 76 having a bore 77 for the slidable reception of a sleeve 78. The body 76 has a plurality of annular grooves 80 to 88, inclusive, spaced longitudinally of the bore 77. The sleeve 78 is provided with a plurality of radially extending ports 90 to 97, inclusive, for registration with certain of the grooves during various positions of the sleeve in the bore 77. Sleeve 78 receives a spool valve 100 which is provided with head sections 101, 102, and 103 which are spaced longitudinally of the spool to provide external grooves 104 and 105 used to connect certain of the ports in the sleeve in certain positions of the spool therein. Sleeve 78 has a rod 106 projecting from one end, which rod extends through the casing 76 and into an opening formed in bracket 28. At the opposite end the sleeve 78 has a cap member 107, this cap serving as an abutment for a spring 108 which also abuts the end of a socket 109 formed in spool 100. The spring 108 normally retains the spool in engagement with the inner closed end of the sleeve 78 in which position it is shown in Fig. 8. When in this position spool 100 serves to direct fluid introduced from a suitable source to one end of the power cylinder 60 to cause movement of piston 74 in a direction which will move the conveyor box outwardly to a position in registration with the hopper 35. This fluid is supplied through line 110 to groove 86 from which it will flow through port 95 to groove 105 in spool 100. From this groove the fluid flows through port 93 to groove 84 which is connected by line 111 with the inner end of the power cylinder 60. When the piston moves in the outward direction, fluid will be discharged from the outer end of power cylinder 60 through line 112 to groove 113 in body 76. This groove 113 is connected with groove 87 and the fluid will flow from the latter groove through port 96 to the interior of the sleeve 78 at the outer end of spool 100. This fluid will flow outwardly from the sleeve through ports 97 to groove 88 and line 114 which leads to reservoir 115, this reservoir forming a part of the fluid supply. After the piston 74 has moved the distance necessary to cause the registration of the conveyor box 37 with the hopper 35 an arm 116 secured to piston rod 58 will engage a collar 117 on rod 106 and move sleeve 78, which is connected with the rod, to a position in which communication between ports 93 and groove 84 is interrupted. This interruption to communication will cause the discontinuance of fluid flow to the inner end of the power cylinder and the piston will stop moving. The apparatus will then be in condition for the next succeeding cycle of operation.

To initiate a cycle of operation it is necessary to move spool 100 in opposition to the force of spring 108, this operation may be performed in many ways, one of which is through the introduction of fluid under pressure through line 118 which communicates with an annular groove 120 surrounding a bore 121 formed in body 76. Groove 120 is connected by passage 122 with groove 81 which surrounds bore 77. When fluid is introduced into groove 81 under pressure, a portion of this fluid will flow through ports 90 and react on the inner end of spool 100 to force the same in opposition to the spring 108 toward the outer end of the sleeve. When the spool has moved to this new position the groove 105 therein will establish communication between ports 95, which communicate with the source of fluid pressure, and ports 96 which are connected by groove 113 and line 112 with the outer end of the power cylinder 60. At this time fluid under pressure may flow from the source through line 110 to the outer end of power cylinder 60 and operate upon piston 74 to move the same toward the inner end of the power cylinder. When the piston moves in this direction fluid will be discharged from the inner end of the power cylinder through line 111 to groove 84 and through ports 92 to groove 104 in spool 100. From this groove the fluid will flow through ports 91 to groove 83 from which it will flow through line 123 to bore 124 also formed in body 76. This bore receives a spool 125 which has a central bore 126 and a pair of external grooves 127 and 128, the latter of which is in communication with line 123. The spool 125 also has lateral ports 130 establishing communication between the central bore 126 and groove 128. Fluid thus introduced to groove 128 from line 123 may flow through ports 130 to bore 126, and outwardly through an orifice 131 to a groove 132 provided at one end of the bore 124, this groove being connected by line 114 with reservoir 115. Due to the resistance to fluid flow offered by the restricted orifice 131 a back pressure will be built up on the fluid flowing from the inner end of the power cylinder, which back pressure will be transmitted by T-shaped passages 133 formed in spool 100, to the interior of the sleeve 78 at the inner end of the spool 100. This back pressure reacts upon spool 100 to maintain the same, in opposition to the spring 108, in position to direct fluid from groove 86 to groove 87 and the outer end of power cylinder 60, this position being maintained even though the supply of fluid under pressure through line 118 may be discontinued.

As piston 74 moves toward the inner end of power cylinder 60 conveyor box 37 and the agitator therein will be moved to a position in registration with the mold. One of the features of the present invention is the reciprocation of the agitator while the conveyor box is so positioned relative to the mold. Valve 75 has been selected for controlling power cylinder 60 to effect this reciprocation of the agitator. To cause this type of operation, valve 75 is provided with a piston valve 134 which is arranged in a line 135 extending from a bore 136 to groove 80 surrounding bore 77. Bore 136 establishes communication, under normal conditions, between fluid pressure inlet line 110 and line 135. When piston valve 134 is in the position shown in Figure 8, flow of fluid from bore 136 to groove 80 is interrupted. Piston valve 134 is fluid pressure operated in both directions, that is, between open and closed positions. After piston 74 of power cylinder 60 has reached its limit of movement in a forward direction and the conveyor box 37 is in registration with the mold the back pressure in line 111, groove 84, groove 104, line 123, groove 128 and the interior of spool 125 will be dissipated by the escape of fluid through orifice 131. When this dissipation of pressure takes place spring 108 will move spool 100 to its original position and fluid flow will be established between line 110 and line 111. This fluid connection will supply fluid pressure to the inner end of power cylinder 60 causing piston 74 to start on a return stroke. When fluid pressure is introduced into line 111 some of this fluid will flow through a branch line 137 extending from line 111 to one end of the bore 138 in which piston valve 134 is disposed. This fluid pressure will move piston valve 134 to a position establishing fluid flow from bore 136 through line 135 to groove 80. This flow of fluid, when the spool 78 is in the position shown in Fig. 8, will supply fluid pressure to groove 81, which pressure will flow through ports 90 to the interior of the sleeve 78 at the inner end of spool 100. This fluid pressure will move spool 100 in opposition to the force of spring 108 to the position establishing communication between line 110 and line 112. The direction of movement of piston 74 will thereby be reversed and piston 74 will be caused to again move in a forward direction.

The distance traversed by piston 74 in the reverse direction will be determined by the rate of fluid flow from the end of bore 138 through line 140, which line contains a control in the form of a needle valve 141. Line 140 connects with a line 142 which leads to the inner end of bore 136 and from this bore through line 143 to groove 87. At the time fluid under pressure is being supplied to the inner end of the power cylinder 60 and a portion of this fluid is being introduced to bore 138, groove 87 will be connected by ports 96, the interior of sleeve 78 and ports 97 with groove 88 which is directly connected with the reservoir 115. It will be seen that fluid may flow from bore 138 due to the movement of piston 134 through lines 140, 142 and 143, the rate of fluid flow being determined by the position of needle valve 141. When piston valve 134 reaches the open position spool 100 will be immediately shifted to reverse the connections of the power cylinder 60 with the supply and tank or reservoir. Valve 141 should be adjusted to limit the stroke of the piston 74 during short reciprocations to the extent of movement of the agitator determined by the lost motion connection at 61. It will be seen that by reciprocating piston 74 through this short stroke the agitator will be moved back and forth while the conveyor box is maintained stationary in registration with the mold. This actuation of the agitator provides a more effective discharge of powdered material from the conveyor box into the mold.

The number of reciprocatory movements of piston 74 may be regulated by a stroke counting mechanism including spool 144 disposed for movement in bore 136. Spool 144 is urged toward the outer end of the bore 136 by a coil spring 145, the degree of movement of the spool being determined by the setting of a stop screw 146. The stroke counting mechanism also includes a pump 147 having a bore 148 and a piston 149. The bore 148 is connected with bore 138 by a line 150 so that when fluid is introduced into bore 138 to move piston 134 fluid will also be introduced into bore 148 to move piston 149. Bore 148 at the opposite end of piston 149 is connected by a line 151 with bore 136 at the outer end of spool 144. Line 151 contains a check valve 152 to limit flow of fluid to a direction from bore 148 to bore 136. It should be obvious that each time piston 149 is moved toward the outer end of bore 148 a predetermined quantity of fluid will be discharged from bore 148 into the outer end of bore 136. This fluid will exert a force on spool 144 to move the same step by step in opposition to the spring 145. When this spool has moved a distance sufficient to permit a shoulder 153 thereon to pass groove 154, with which line 110 is connected, communication between line 110 and line 135 will be interrupted. At this time no fluid can be introduced through line 135 to the space at the inner end of spool 100 and this spool will then remain in position to direct fluid pressure to the inner end of power cylinder 60. Piston 74 will then continue in its retractive stroke moving conveyor box 37 to a point in registration with the hopper for receiving additional powdered material. It should be apparent from the foregoing description and an inspection of Figure 8 that the number of short reciprocations of the piston 74 may be regulated through the adjustment of the screw 146.

Valve 75 also has a speed control mechanism for regulating the rate of travel of the piston 74 and conveyor box 37. This speed control includes needle valve 155 which is employed to create a pressure drop the higher pressure of which is applied to the end of spool 125 to move the same in opposition to the force of spring 156, to a position establishing communication between a groove 157 with which line 110 is connected and groove 132, which is connected directly with reservoir 115. When spool 125 is moved in this manner a portion of the supply of fluid pressure will be bypassed directly to reservoir 115 and will thus be unavailable for moving piston 74. When piston 74 approaches the limit of its retractive stroke, arm 116 on rod 58 will engage collar 117 on rod 106 and move sleeve 78 to a position to interrupt fluid flow to the inner end of power cylinder 60 as previously described. When sleeve 78 is moved in this manner cap 107 will engage the inner end of the stem of check valve 158 and move it to an open position establishing communication between line 160, which is connected with the outer end of bore 136, and groove 88. This communication will permit fluid to be discharged from the outer end of bore 136 to the reservoir and stroke counting spool 144 will be reset for the next succeeding operation. As previously mentioned, valve 75 is illustrated and described in the above-mentioned copending application of Cecil E. Adams and no claim thereto is made herein. Valve 75 has been constructed for connection with the hydraulic circuit of the pressing mechanism, and includes means for controlling the operation of the pressing mechanism, but it should be obvious that it can be utilized either as shown or with modifications to effect only the operation of power cylinder 60 and the feeding mechanism shown herein.

While the form of embodiment of the present invention as herein disclosed constitutes a preferred form, it is to be understood that other forms might be adopted, all coming within the scope of the claims which follow.

I claim:

1. Apparatus for transferring pulverulent material from a loading point to a discharge point comprising a plate-like support; a compartment-forming member disposed on said support for movement between said loading and discharge points; agitator means in the compartment in said member, said agitator being both movable with and relative to said member; and a fluid motor of the piston and cylinder type for moving said member and said agitator, the piston being directly connected with said agitator and having a lost motion connection with said member.

2. Apparatus for transferring pulverulent material from a loading point to a discharge point comprising a plate-like support; a compartment-forming member disposed on said support for movement between said loading and discharge points; agitator means in the compartment in said member, said agitator being both movable with and relative to said member; a fluid motor of the piston and cylinder type for moving said member and said agitator; means directly connecting said agitator with said motor piston; a lost-motion connection between said member and said piston; and valve means for controlling the operation of said motor, said valve means serving to cause repeated short reciprocations of said piston at one end of the normal stroke thereof.

3. Apparatus for transferring pulverulent material from a loading point to a discharge point comprising a plate-like support; a member having side and end pieces connected to form a compartment, said member being disposed on said support for movement between loading and discharge points; an agitator having longitudinally extending side bars and spaced bars extending transversely therebetween, said agitator being movable for a limited distance in said compartment; a power cylinder operative to reciprocate said member and agitator between loading and unloading positions; connecting means between said power cylinder and said member and agitator, said means permitting limited movement of said agitator by said power cylinder while said member is stationary; and valve means functioning to effect limited forward and reverse operation of said power cylinder to move said agitator relative to said compartment-forming member.

4. Apparatus for feeding powdered material to a mold comprising a plate-like support; a hopper supported over said support in spaced relation from the mold; a member provided with a compartment, said member being disposed on said support for movement between positions of registration with said hopper and the mold; an agitator having spaced longitudinally extending side bars and spaced rods extending transversely therebetween disposed in the compartment in said member, the length of said agitator being less than the length of said compartment, a fluid motor of the piston and cylinder type for reciprocating said member and agitator between said position; and means connecting said piston directly to said agitator and with a limited amount of lost motion to said member.

5. Apparatus for transferring pulverulent material from a loading point to a discharge point comprising a support; a compartment forming member disposed for reciprocation on said support between loading and discharge points; an agitator in the compartment in said member, said agitator being movable with and relative to said member; a fluid motor for moving said agitator relative to said member and said member and agitator together between loading and discharge points; a source of fluid pressure; and means for controlling the flow of fluid from said pressure source to said fluid motor to cause said motor to move said member and agitator from loading to unloading position then move said agitator relative to said member while the latter remains stationary.

WILLARD K. CARTER.

REFERENCES CITED

The following references are of record in the file of this patent:

UNITED STATES PATENTS

| Number | Name | Date |
|---|---|---|
| 351,780 | Koch et al. | Nov. 2, 1886 |
| 949,043 | Pratt | Feb. 15, 1910 |
| 1,308,213 | Yingling | July 1, 1919 |
| 1,393,270 | Downward | Oct. 11, 1921 |